US008816296B2

(12) United States Patent
Clark et al.

(10) Patent No.: US 8,816,296 B2
(45) Date of Patent: Aug. 26, 2014

(54) NOBLE-GAS-EXCIMER DETECTORS OF SLOW NEUTRONS

(75) Inventors: Charles W. Clark, Wheaton, MD (US); Patrick P. Hughes, Bowie, MD (US); Michael Alan Coplan, Chevy Chase, MD (US); Alan Keith Thompson, Riverdale, MD (US); Robert E. Vest, Washington, DC (US)

(73) Assignee: The United States of America, as represented by the Secretary of Commerce, The National Institute of Standards and Technology, Washington, DC (US)

( * ) Notice: Subject to any disclaimer, the term of this patent is extended or adjusted under 35 U.S.C. 154(b) by 213 days.

(21) Appl. No.: 13/282,571

(22) Filed: Oct. 27, 2011

(65) Prior Publication Data

US 2012/0104269 A1 May 3, 2012

Related U.S. Application Data

(60) Provisional application No. 61/429,207, filed on Jan. 3, 2011.

(51) Int. Cl.
*G01T 3/00* (2006.01)

(52) U.S. Cl.
USPC .......... 250/375

(58) Field of Classification Search
USPC .......... 250/375
See application file for complete search history.

(56) References Cited

U.S. PATENT DOCUMENTS 4,447,727 A * 5/1984 Friesenhahn .......... 250/390.01
H000407 H * 1/1988 George .......... 376/147
2009/0114843 A1* 5/2009 Thompson et al. .......... 250/473.1

* cited by examiner

*Primary Examiner* — David Porta
*Assistant Examiner* — Hugh H Maupin
(74) *Attorney, Agent, or Firm* — Steve Witters; Witters & Associates

(57) ABSTRACT

The present invention relates to apparatus and methods for use in highly sensitive and efficient neutron detection, that includes using trigger reactions to initiate far-ultraviolet (FUV) optical emissions. In some embodiments of the present invention, a method for the detection of slow neutrons includes absorption of a slow neutron with a high neutron capture-cross-section nucleus, decay of the compound nucleus into energetic particles, creation of excimers from the energetic particles reacting with a background gas to form excimers, radiative decay of excimers resulting in emission of FUV radiation, and detection of the FUV radiation using an optical detector.

19 Claims, 8 Drawing Sheets

NOBLE-GAS-EXCIMER DETECTORS OF SLOW NEUTRONS

CROSS REFERENCE TO RELATED APPLICATION

This application claims the benefit of priority of U.S. Provisional Patent Application 61/429,207, filed Jan. 3, 2011, which is hereby incorporated by reference in its entirety.

STATEMENT OF FEDERAL RIGHTS

This work was funded by the National Institute of Standards and Technology (NIST) of the United States Department of Commerce.

FIELD OF THE INVENTION

The present invention generally relates to the detection of radiation and, more particularly, is concerned with detection and measurement of slow neutrons.

BACKGROUND OF THE INVENTION

Mechanisms for detecting neutrons in matter are generally based on indirect methods. Neutrons are generally detected by the signatures they produce through interactions with surrounding material. Such interactions include elastic scattering producing a recoiling nucleus, inelastic scattering producing an excited nucleus, or absorption with transmutation of the resulting nucleus. Most detection approaches rely on detecting the various reaction products of such interactions.

In one type of neutron interaction with matter, high-energy neutrons are scattered by a nucleus, transferring some of the kinetic energy of the neutrons to the nucleus. If enough energy is transferred, the recoiling nucleus ionizes the material surrounding the point of interaction. Since the maximum transfer of energy occurs when the mass of the atom with which the neutron collides is comparable to the neutron mass, hydrogenous materials are often the preferred medium for such detectors. In another type of neutron interaction with matter, low-energy ("slow") neutrons react with surrounding absorber materials to produce absorption products, such as protons, alpha particles, gamma rays, and fission fragments. Typical absorber materials used in this type of detection have high cross sections for absorption of neutrons, and include Helium-3 ($^3He$), Lithium-6 ($^6Li$), Boron-10 ($^{10}B$), and Uranium-235 ($^{235}U$). Each of these reacts with neutrons to produce high-energy ionized particles that can be detected by different means.

Detectors employing either target nuclei or nuclear reactions use solid, liquid, or gas-filled detection media. A majority of neutron detectors in use today are gas-filled proportional counters, and in particular, either $^{10}BF_3$ or $^3He$ gas proportional tubes.

Because slow neutrons have insufficient energy to ionize materials directly, a nucleus with high neutron absorption cross-section is added to gas-filled detectors to facilitate detection. Nuclei commonly used for this purpose are $^{10}B$ and $^3He$. In gas-filled proportional neutron detectors using $^3He$ as the fill gas, the neutron reacts with the $^3He$ nucleus resulting in the production of a triton (the nucleus of tritium, $^3H$) and a proton. The triton and the proton share the reaction energy of 765-keV (kilo-electron volts). These energetic particles generate electrons by ionizing collisions with fill-gas atoms. The electrons are accelerated by a high voltage (1300 to 2000 volts) maintained in the proportional counter, and this results in an electrical discharge that is detected as an electrical signal. In gas-filled proportional neutron detectors using $BF_3$ as the fill gas, absorption of a neutron by $^{10}B$ results in the production of $^4He$ and $^7Li$, with 2310 keV shared between them. The $^7Li$ is left in an excited state with 93% probability from which it subsequently decays by emitting a 480-keV gamma ray. The energetic products of the neutron reaction generate an electrical discharge in the fill gas by a mechanism similar to that of the $^3He$ proportional counter.

Many instruments in the field use $BF_3$, but because $BF_3$ is toxic and corrosive, the use of $^3He$ has traditionally been preferred. $^3He$ proportional tube detectors have higher efficiencies, with none of the disadvantages of $BF_3$. All proportional detectors require high voltages to produce electrical discharges, are susceptible to microphonic noise, and have a dead time of approximately 1 microsecond that limits their maximum counting rate. The tubes also require an ultra-pure quench gas (usually $CO_2$) to achieve a sufficient signal-to-noise ratio, and suffer from wall effects when particle energy is lost by absorption at the tube walls.

Despite the above disadvantages, $^3He$ proportional tube detectors are effective and are the preferred choice in many types of operations, including oil well logging and medical applications such as diagnosis of chronic obstructive pulmonary diseases. The supply of $^3He$ is limited, and therefore, large-scale deployment of $^3He$ is not currently possible. Alternatives to $^3He$-based neutron detection are necessary to meet the needs for highly sensitive neutron detectors having neutron/gamma discrimination similar to those of $^3He$ detectors. Such detectors are required for safeguarding nuclear materials and weapons, treaty verification, anti-proliferation, recovery of lost military payloads, surveillance at border and port facilities, transportation systems and other places through which large amounts of material pass on a regular basis.

Another class of conventional neutron detectors is scintillation-based detectors. Such detectors are based on photon emission resulting from the interaction of energetic charged nuclei released from collisions between incident neutrons and atomic nuclei with scintillation materials. Scintillation devices are typically coupled to a photon detector that generates an analog electrical signal based on the production of the light within the scintillation material. The photon detector analog signal is a measure of the incident neutron irradiation. To enhance the efficiencies of the scintillators, neutron sensitive materials are typically doped with $^6Li$ and $^{10}B$. However, neutron/gamma ray discrimination remains an issue for scintillators, and must be resolved in order for scintillators to becoming practical for $^3He$ replacement.

Another class of neutron detectors includes solid state neutron detection devices based on thin films of $^{10}B$ or $^6Li$ coated onto silicon and other substrates. Losses in the substrate limit the ultimate efficiency of multi-layer detectors of this type.

A need exists for highly sensitive neutron detectors having neutron/gamma discrimination similar to $^3He$ detectors.

SUMMARY OF THE INVENTION

The present invention provides a highly sensitive neutron detectors having neutron/gamma discrimination similar to $^3He$ detectors and can be used in large-scale deployment. Accordingly, the present invention relates to a method for detecting slow neutrons, which include the operative steps of: reacting a plurality of slow neutrons with a compound nucleus, wherein the compound nucleus decays into a plurality of particles; exposing the plurality of particles to at least one inert gas, wherein the plurality of particles interact with the at least one inert gas to form at least one excimer; and monitoring the at least one excimer for an optical signal comprising a plurality of photons in the far-ultraviolet region of the electromagnetic spectrum, wherein the optical signal in the far ultraviolet region of the electromagnetic spectrum indicates radiative decay of the at least one excimer, wherein the radiative decay of the at least one excimer comprises emission of the plurality of photons in the far ultraviolet region of the electromagnetic spectrum. More specifically, the compound nucleus is a high-capture cross-section nucleus.

In one aspect of the present invention, the high-capture cross-section nucleus is selected from a group comprising $^{10}B$, $^{6}Li$ and $^{3}He$, and at least one inert gas is selected from a group comprising Ar, Kr, and Xe. In some aspects of the present invention, $^{10}B$ is in gaseous phase and, in other aspects of the present invention, $^{10}B$ is in solid phase. In some embodiments of the present invention, the compound nucleus is $^{10}BF_3$. In at least one embodiment of the present invention, the plurality of slow neutrons is a beam line having a diameter of about 4 mm and a fluence rate of about $(2.61\pm0.37)\times10^5$ neutrons/cm$^2$ s s$^{-1}$ cm$^{-2}$.

In one embodiment of the present invention, the method for detecting slow neutrons further includes the steps of detecting the plurality of photons in the far ultraviolet region emitted by the radiative decay of the at least one excimer, and determining the number of photons emitted for each of the plurality of the reacted slow neutron.

The present invention also related to an apparatus for detecting a plurality of slow neutrons, which includes: at least one cell among a plurality of cells, wherein the at least one cell comprising an interaction region for reacting the plurality of slow neutrons with a high-capture cross section compound nucleus and at least one inert gas; a cylinder defining the interaction region, wherein the cylinder is positioned vertically in the center of the at least one cell; an entry port on the at least one cell of the plurality of cells for receiving the plurality of slow neutrons; an exit window on the at least one cell of the plurality of cells for allowing the plurality of slow neutrons to exit the at least one cell of the plurality of cells; at least one detector positioned within a field of view of the interacting region for detecting an optical signal in the far ultraviolet region of the electromagnetic spectrum from the at least one cell, wherein the detector generates a signal upon detection of the optical signal in the far ultraviolet region of the electromagnetic spectrum; and a processor associated with the at least one cell, and the at least one detector for processing the signal generated by the detector to measure slow neutron fluence. More specifically, the exit port is comprised of a material selected from a group consisting of $MgF_2$, $CaF_2$, $Al_2O_3$, $SiO_2$.

The apparatus in accordance with an embodiment of the present invention further includes a chamber enclosing a differentially pumped volume for isolating and evacuating the unreacted plurality of slow neutron exiting interaction region. In one embodiment, the apparatus further includes a gas handling system for maintaining a base pressure inside the at least one cell.

In one embodiment of the present invention, the cylinder is comprised of a material selected from a group consisting of magnesium, aluminum and silicon, and has a diameter of about 25 mm.

Another embodiment of the present invention relates to a method for detecting slow neutrons, which includes the steps of: reacting a plurality of slow neutrons with a compound nucleus, wherein the compound nucleus decays into a plurality of particles; exposing the plurality of particles to at least one inert gas, wherein the plurality of particles interact with the at least one inert gas to form at least one excimer; detecting an optical signal comprising a plurality of photons in the far-ultraviolet region of the electromagnetic spectrum, wherein the optical signal in the far ultraviolet region of the electromagnetic spectrum indicates radiative decay of the at least one excimer, wherein the radiative decay of the at least one excimer comprises emission of the plurality of photons in the far ultraviolet region of the electromagnetic spectrum; and processing the optical signal comprising the plurality of photons in the far-ultraviolet region of the electromagnetic spectrum to measure slow neutron fluence. More specifically, the compound nucleus is a high-capture cross-section nucleus, and is selected from a group comprising $^{10}B$, $^{6}Li$, and $^{3}He$. In one aspect of the present invention, the at least one inert gas is selected from a group comprising Ar, Kr, and Xe.

In one embodiment of the present invention, the method for detecting slow neutrons further includes the step of determining the number of photons emitted for each of the plurality of the reacted slow neutron.

DETAILED DESCRIPTION

Figure 1:
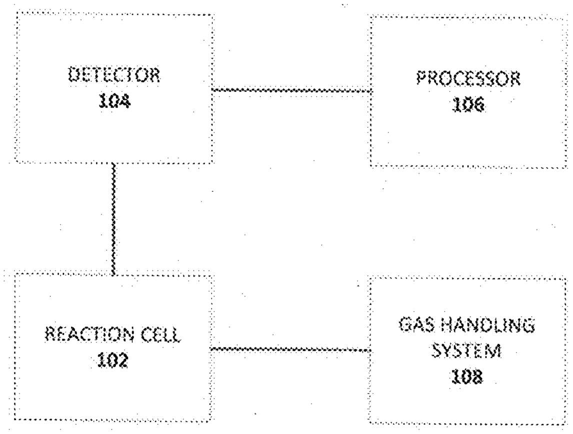
FIG. 1 illustrates a slow neutron detection apparatus in accordance with an embodiment of the present invention.

As used throughout the disclosure, the following terms, unless otherwise indicated, shall be understood to have the following meanings.

"Differentially pumped volume" refers to a section in a vacuum chamber that can be isolated and evacuated independently from the rest of the system.

"Excimer" means an "excited dimer" or a diatomic molecule for which the ground state is unbound.

"Energetic particle" refers to an atom nucleus, electron or proton that has a kinetic energy above about 1 eV "Fluence" means the total number of particles that pass through a unit area in a specified time interval.

"High cross section nucleus" means a nucleus that has a high probability of reacting (interacting) with an incident neutron.

The present invention relates to apparatus and methods for use in highly sensitive and efficient neutron detection, including trigger reactions to initiate far-ultraviolet (FUV) optical emissions. In some embodiments of the present invention, a method for the detection of slow neutrons includes absorption of a slow neutron by a high neutron absorption cross section nucleus with subsequent decay of the compound nucleus into energetic particles, creation of excimers by the energetic particles in a gas, radiative decay of the excimers resulting in emission of far ultraviolet (FUV) radiation, and detection of the FUV radiation using an optical detector.

FUV photons may be detected from the reaction occurring in a gas cell filled with a mixture of gas-phase or solid neutron absorber and noble gases. Exemplary neutron absorbers that can be used in a cell include $^{3}He$, $^{10}B$, $^{6}Li$, and the like. In one embodiment of the present invention, FUV radiation is detectable in gas mixtures using $^{3}He$ with a base pressure of 26 kPa combined with varying pressures of Ar, Kr or Xe. In other embodiments of the present invention, gases containing $^{10}B$ or $^{6}Li$ can be incorporated in the noble gas in the cell, or solid-phase neutron absorbers may be used. Exemplary solid-phase neutron absorbers include $^{10}B$, $^{6}Li$, and the like.

The signal from gas cell is due to the formation and radiative decay of excimers in a gas mixture including noble gases. In one embodiment of the present invention, Ar, Kr and Xe can be combined with an appropriate neutron absorber to form gas mixtures that facilitate the formation of excimers in a reaction cell. An appropriate neutron absorber is one that has a high probability of absorbing a neutron with subsequent decay into energetic particles. These energetic particles collide with the surrounding noble gas atoms to form excimers resulting in the production of photons in the FUV range. The noble gases are essentially transparent to the FUV photons, making it possible for the light to pass from the gas cell and be detected.

The present invention provides a highly efficient neutron detector as an alternative to existing proportional counters. The present invention uses optical radiation from excited atoms as the signature of a neutron reaction.

Referring now to the drawing, and more particularly, to FIG. 1, there is shown an apparatus for detecting slow neutrons, generally designated 100, which comprises embodiments of the present invention. The slow neutron detection apparatus 100 includes a reaction cell 102, a detector 104, a processor 106, and a gas handling system 108. Reaction cell 102 provides a chamber for slow neutrons from a neutron source to interact with a mixture of neutron absorber and nobles gases. Detector 104 detects FUV radiation emitted by reactions occurring in cell 102 filled with a mixture of gas-phase neutron absorber (e.g. $^{3}He$ or $BF_3$) or a solid phase neutron absorber (e.g. $^{10}B$ or $^{6}Li_2CO_3$) and noble gases. Detector 104 produces electrical signals and processor 106 converts electrical signals from detector 104 into a measure of slow neutron fluence. A measure of FUV radiation from the reaction of neutron absorption products and background neutral gas is indicative of the presence of slow neutrons.

Gas handling system 108 transports neutron absorbers and noble gases from their respective sources to cell 102. Gas handling system 108 also includes at least one vacuum pump to maintain differentially pumped volume in a compartment 220 (FIG. 2) between reaction cell 102 and detector 104. Gas handling system 108 monitors pressure in reaction cell 102 with a digital pressure indicator without requiring correction for gas type. Exemplary digital pressure indicators for gas handling system 108 include Omega DPI 705 with an operating range from about 0.013 kPa (0.1 Torr) to about 200 kPa (1500 Torr) with a measurement resolution of about 13 Pa (0.1 Torr).

Figure 2:
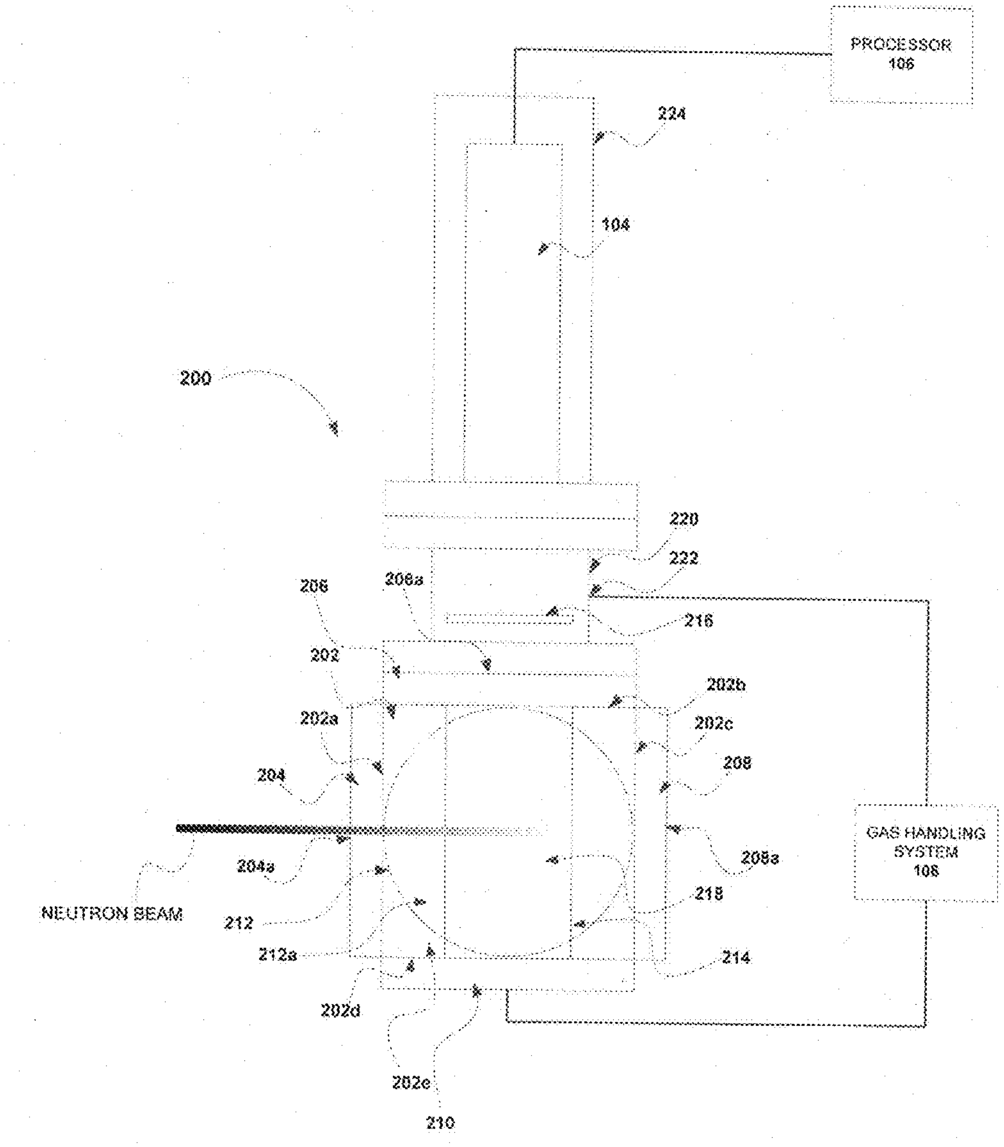
FIG. 2 illustrates a reaction cell of a slow neutron detection apparatus in accordance with one embodiment of the present invention.

FIG. 2 illustrates one embodiment of a reaction cell, generally designated as 200, for detecting slow neutrons using gas phase neutron absorbers. Reaction cell 200 includes a stainless steel cube 202 with cylindrical metal-seal flange ports 204, 206, 208, 210, 212 (five ports shown in FIG. 2) on each of its six faces. In one embodiment of the present invention, metal-seal flange ports 204, 206, 208, 210, 212 (five ports shown in FIG. 2) on each of the six faces of cube 202*a-e* (five faces shown in FIG. 2) is cylindrical with a diameter of about 70 mm. Metal-seal flange port 204 on front face 202*a* of cube 202 includes an entry window 204*a* through which a neutron beam is capable of entering cube 202 of reaction cell 200. An exit window 208*c* is located on cube face 208 through which the neutron beam is capable of exiting cube 202 of reaction cell 200. In one embodiment of the present invention, entry window 204*a* and exit window 208*c* have a diameter of about 35 mm and a thickness of about 3.3 mm. Exemplary materials for entry window 204*a* and exit window 208*c* include silicon, magnesium, fused silica, and the like.

Cube 202 includes a cylinder 214 positioned vertically in the center of cube 202 such that cylinder 214 defines a neutron interaction region 218. Cylinder 214 is thin-walled and is made from a material that is vacuum compatible and neutron transparent. Exemplary materials that can be used for the construction of cylinder 214 include magnesium, aluminum, silicon, and the like. In some embodiments of the present invention, cylinder 214 has a thickness from about 0.5 mm to about 1 mm and a diameter of about 24 mm to about 26 mm. In one embodiment of the present invention, cylinder 214 is thin-walled magnesium cylinder having a diameter of about 25 mm. Entry window 204*a*, exit window 208*c* and cylinder 214 are transparent to neutrons, and neither scatter nor absorb a neutron beam passing through them. Top face 202*b* of cube 202 includes an exit window 206*a* for FUV light emissions exiting from interaction region 218. In one embodiment of the present invention, exit window 206*a* is about 29 mm in diameter. Exemplary materials of exit window 206*a* include $MgF_2$, $CaF_2$, $Al_2O_3$, $SiO_2$, and the like.

Detector 104 is positioned inside a detector housing 224 such that interaction region 218 is within the field of view of detector 104. Detector housing 224 is mounted above top face 202*b* of cube 202. In one embodiment of the present invention, detector 104 is a photomultiplier tube (PMT). An exemplary detector for detecting emitted radiation include Hamamatsu solar-blind R6835 photomultiplier tube in a modified model 658 end-on housing from McPherson Instruments, Inc. The R6835 has a $MgF_2$ window and a CsI photocathode. Reaction cell 200 includes a compartment 220, positioned between detector 104 and exit window 206*a* for housing filters 216. Filter 216 is used to form a spectrometer to analyze the wavelength of the emitted radiation from interaction region 218 passing through exit window 206*a*. Exemplary filters that may be used to form a coarse spectrometer include $Al_2O_3$, $CaF_2$, $SiO_2$ filters, and interference filters. Compartment 220 encloses a differentially pumped volume to prevent gas exiting interaction region 218 from coming into contact with the detector 104. Gas handling system 108 maintains compartment 220 at low pressure using a vacuum pump connected to compartment 220 at manifold 222.

Under normal operation of an embodiment of the present invention using gas-phase neutron absorbers, gas handling system 108 will evacuate all gases from reaction cell 200. Further, reaction cell 200 is heated to remove water and contaminants from cell walls. In one embodiment of the present invention, reaction cell 200 is heated for at least 10 h at 70° C. while being evacuated. Evacuation and heating of reaction cell 200 creates a base pressure within reaction cell 200. In one embodiment of the present invention, evacuation and heating of reaction cell 200 results in a base pressure of about $3\times10^{-8}$ kPa. After heating and evacuating cell 200 to base pressure, a neutron absorber gas is introduced into cell 200 through manifold 210 using gas handling system 108. Noble gases are also introduced into interaction region 218 through manifold 210 using gas handling system 108. In one embodiment of the present invention, noble gases introduced into interaction region include ultrahigh purity Ar, Kr, and Xe. In some embodiments of the present invention, a gas filter is connected between manifold 210 and cube 202 to remove trace contaminants from the gas sources. Exemplary filters that can be used to remove trace contaminants from gas include Microtorr MC1-902-F filter, and the like.

A beam of neutrons enters reaction cell 200 through entry window 204*a* attached to metal-seal flange port 204 on front face 202*a* of cube 202. In one embodiment of the present invention, the neutron beam entering reaction cell 200 through entry window 204*a* has a diameter of about 4 mm and a fluence rate of about $(2.61\pm0.37)\times10^5$ neutrons/$cm^2$ s. An exemplary beam line having such properties includes NG6-A beam line at the NIST Center for Neutron Research (NCNR). Neutrons enter neutron interaction region 218 defined by cylinder 214. Within interaction region 218, slow neutrons react with high neutron absorption cross-section nuclei with subsequent decay of the compound nucleus into energetic particles. The energetic particles undergo collisions with noble gas atoms within interaction region 218 to form excimers. Excimers formed within interaction region 218 radiatively decay with emission of FUV electromagnetic radiation. Unreacted neutrons exit from interaction region 218 through exit window 208*c*. FUV emissions pass through exit window 206*a* and filter 216 into compartment 220. Compartment 220 enclosing a differentially pumped volume is evacuated by gas handling system 108. FUV emissions pass through compartment 220 into detector housing 224 where FUV emissions are detected by detector 104. Detector 104 is generally operated in photon-counting mode with its output connected to processor 106. In photon-counting mode, detector 106 counts the number of FUV photons emitted from interaction region 218. In one embodiment of the present invention, processor 106 is a preamplifier followed by a spectroscopy amplifier whose output drives the input of a multichannel analyzer.

Experimental count rates of detector 104 can be corrected for dark current, background gamma radiation, and radiation from the direct interaction of neutrons and noble gases within interaction region 218. These corrections remove contributions to the signal received by detector 104 from sources other than neutron absorption by a neutron absorber in interaction region 218. Measurements taken in evacuated reaction cell 200 and with reaction cell 200 filled with different pressures of noble gases, but without a neutron-absorber, may be used to remove signal contributions from sources other than neutron absorption in interaction region 218. The signal received by detector 104 can also be corrected for FUV radiation that is reflected into detector 104 by scattering from the wall of magnesium cylinder 214. In some embodiments of the present invention, the ratio of scattered to direct radiation received by detector 104 is between 0.14 and 0.31. Ratios of scattered to direct radiation can be determined from ray tracing calculations based on a 4 mm diameter cylindrical source aligned with the neutron beam and using optical constants for MgO (the surface is assumed to be oxidized rather than unreacted Mg) shown in Table 1.

TABLE 1

| λ (μm) | $\epsilon_1$ | $\epsilon_2$ |
|---|---|---|
| 135 | 5.5 | 1.5 |
| 160 | 8.0 | 4.0 |
| 200 | 3.5 | 0 |

Figure 3:
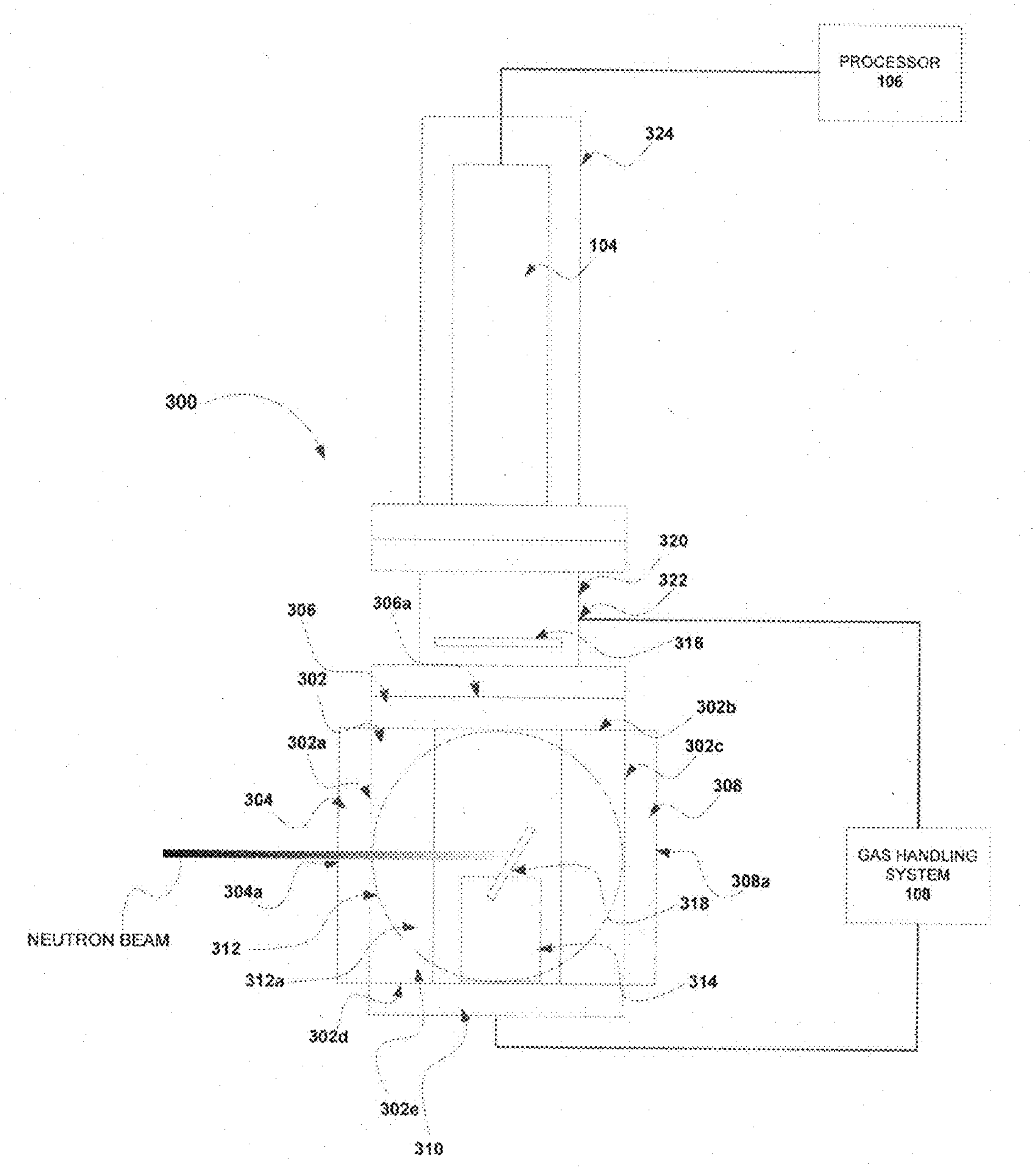
FIG. 3 illustrates a reaction cell of a slow neutron detection apparatus in accordance with another embodiment of the present invention.

FIG. 3 illustrates another embodiment of a reaction cell for detecting slow neutrons using solid phase neutron absorbers. Reaction cell 300 includes a stainless steel cube 302 with cylindrical metal-seal flange ports 304, 306, 308, 310, 312 (five ports shown in FIG. 3) on each of its six faces. In one embodiment of the present invention, metal-seal flange ports 304-312 on each of the six faces of cube 302*a-e* (five faces shown in FIG. 3) are cylindrical with a diameter of about 70 mm. Metal-seal flange port 304 on front face 302*a* of cube 302 includes an entry window 304*a* through which a neutron beam is capable of entering cube 302 of reaction cell 300 and an exit window 308*c* through which a neutron beam is capable of exiting cube 302 of reaction cell 300. In one embodiment of the present invention, entry window 304*a* and exit window 308*c* have a diameter of about 35 mm and a thickness of about 3.3 mm. Exemplary materials used for making exit window include silicon, magnesium, fused silica, and the like.

Cube 302 includes a solid target holder 314 positioned vertically in the center of cube 302. In one embodiment of the present invention, target holder 314 is an aluminum cylinder having a diameter of about 25 mm and a height of about 35 mm. Target holder 314 includes a slot for holding a target neutron absorber 318 such that a neutron beam entering cube 302 is capable of interacting with neutron absorber 318. Target neutron absorber 318 is positioned such that its planar axis forms an angle with the axis of the neutron beam entering cube 302. In one embodiment of the present invention, planar axis of neutron absorber 318 and axis of neutron beam form an angle from about 10 degrees to about 90 degrees. In some embodiment of the present invention, planar axis of neutron absorber 318 and axis of neutron beam form an angle of about 45 degrees. Entry window 304*a*, exit window 308*c* and target holder 314 are transparent to neutrons, and neither scatters nor absorbs a neutron beam passing through them. Top face 302*b* of cube 302 includes an exit window 306*a* for emissions resulting from interactions between target neutron absorber. In one embodiment of the present invention, exit window 306*a* is about 29 mm in diameter. Exemplary materials of exit window 306*a* include $MgF_2$, $CaF_2$, $Al_2O_3$, $SiO_2$, and the like.

Detector 104 is positioned inside a detector housing 324 such that the interaction region between neutron beam entering cube 302 and target neutron absorbers 318 is within the field of view of the detector 104. In one embodiment of the present invention, detector 104 is a photomultiplier tube (PMT). Detector housing 324 is mounted above top face 302*b* of cube 302. Exemplary detectors for detecting emitted radiation include Hamamatsu solar-blind R6835 photomultiplier tube in a modified model 658 end-on housing from McPherson Instruments, Inc. The R6835 has a $MgF_2$ window and a CsI photocathode. Reaction cell 300 includes a compartment 320, positioned between detector 104 and exit window 306*a* for housing a filter 316. Filter 316 is used to form a coarse spectrometer to analyze the wavelength of the emitted radiation from cube 302 passing through exit window 306*a*. Exemplary filters that may be used to form a coarse spectrometer include $Al_2O_3$, $CaF_2$, $SiO_2$ filters, and the like. Compartment 320 is operated at a low pressure to prevent gas mixtures exiting cube 302 from coming into contact with the detector

104, which could render detector 104 inoperative over time. Gas handling system 108 maintains compartment 320 at a low pressure using a vacuum pump connected to compartment 320 at manifold 322.

Under normal operation of an embodiment of the present invention using solid-phase neutron absorbers, gas handling system 108 will evacuate all gases from reaction cell 300. Further, reaction cell 300 is heated to remove water and contaminant from cell walls, neutron absorber, and substrate. In one embodiment of the present invention, reaction cell 300 is heated for at least 10 h at 70° C. while being evacuated. Evacuation and heating of reaction cell 300 creates a base pressure within reaction cell 300. In one embodiment of the present invention, evacuation and heating of reaction cell 300 creates a base pressure of about $3\times10^{-8}$ kPa. Noble gases are introduced into cube 302 through manifold 310 using gas handling system 108. In one embodiment of the present invention, noble gases introduced into interaction region include ultrahigh purity Ar, Kr, and Xe. In some embodiments of the present invention, a gas filter is connected between manifold 310 and cube 302 to remove trace contaminants from gas sources. Exemplary filters that can be used to remove trace contaminants from gas include Microtorr MC1-902-F filter, and the like.

A beam of neutrons enters reaction cell 300 through entry window 304*a* attached to metal-seal flange port 304 on front face 302*a* of cube 302. In one embodiment of the present invention, neutron beam entering reaction cell 300 through entry window 304*a* has a diameter of about 4 mm and a neuron beam fluence rate of about $(2.61\pm0.37)\times10^{5}\ s^{-1}\ cm^{-2}$. Beam lines having such properties include the NG6-A beam line at NCNR. Neutrons entering cube 302 react with high neutron absorption cross-section nuclei in the solid-phase 318 resulting in decay of the resulting compound nucleus into energetic particles. The energetic particles escape the solid material and undergo collisions with noble gas atoms within cube 302 to form excimers. Excimers formed within cube 302 radiatively decay with the emission of FUV radiation. Unreacted neutrons exit from cube 302 through exit window 308*e*. FUV emissions pass through exit window 306*a* and spectral filter 316 into compartment 320. FUV emissions pass through compartment 320 into detector housing 324 where FUV emissions are detected by detector 104. Detector 104 is generally operated in photon-counting mode with its output connected to processor 106. In photon-counting mode, detector 106 counts the number of FUV photons emitted from cube 318. In one embodiment of the present invention, processor 106 is a preamplifier followed by a spectroscopy amplifier whose output drives the input of a multichannel analyzer.

In one embodiment of the present invention, detector 104 can be calibrated using the radiation from a synchrotron over the wavelength region 125 to 210 nm. Calibration results for detector 104 can be convolved with the emission spectrum of each excimer to determine an effective efficiency of detector 104 for each of noble gases used. Processor 106 calculates the total number of photons generated using photon flux detected by detector 104. Correcting the calculated total for background, window transmission, solid angle, and using known cross section of the reaction within reaction cell and the neutron flux, the number of photons produced for each reacted neutron can be calculated using ng equations (1)-(3):

$$\text{Number of neutrons reacted per unit time}=N_f A[1-e^{-\sigma nl}]/t \tag{1}$$

where $N_f$ is the measured neutron beam fluence, A is the area of the beam, σ is the neutron absorption cross section of the neutron absorber, n is the number density of the neutron absorber, l is the length of the path where the neutrons are exposed to the neutron absorber, and t is the observation time; and $$\text{Number of photons produced per unit time}=[P_C-B-R]/[E_{PMT}\cdot E_F\cdot W_W\cdot\omega_a\cdot t] \tag{2}$$

where $P_C$ is the raw number of counts from the PMT, B is the background counts associated with the experiment, R is the calculated reflection contribution, $E_{PMT}$ is the efficiency of the PMT for the emission spectrum, $E_F$ is the filter efficiency for the emission spectrum, $E_W$ is the window efficiency for the emission spectrum, and $\omega_a$ is the fraction of the solid angle the PMT covers of the reaction volume. The number of photons per neutron reacted are calculated using $$\{[P_C-B-R]/[E_{PMT}\cdot E_F\cdot E_W\cdot\omega_a]\}/N_f A[1-e^{-\sigma nl}] \tag{3}$$

EXAMPLES

A more complete understanding of the present invention can be obtained by referring to the following illustrative examples of the practice of the invention, which examples are not intended, however, to be unduly limitative of the invention.

Example 1

Far-ultraviolet signatures of $^3$He(n,tp) reaction in noble gas mixtures.

Trigger reaction of $^3$He(n,tp) process, in which a neutron reacts with a $^3$He nucleus to produce a proton and a triton with excess energy of 764 keV, is used to initiate far-ultraviolet (FUV) optical emissions, rather than electrical discharges. At a $^3$He pressure of 100 kPa, tens of FUV photons are produced for every reacted neutron. When mixtures of Ar, Kr or Xe are added to the $^3$He cell, larger FUV signals were observed. These signals were larger than the ones observed when the cell contained only $^3$He and, in some cases, these signals were larger by factor of 1000. Using spectral analysis discussed below, this radiation was identified to be predominantly due to rare gas excimer ($X_2$*) emissions.

The experimental apparatus consists of a gas cell, photomultiplier tube (PMT) detector and gas handling system connected to a turbo-molecular/molecular-drag pump backed by an oil-free diaphragm pump. The gas cell is a stainless steel cube with 70-mm diameter metal-seal flange ports on each of the six faces. It also includes a compartment to allow the insertion of spectral filters in front of the PMT. $Al_2O_3$, $CaF_2$ and $SiO_2$ filters were used to form a coarse spectrometer to analyze the wavelength of the emitted radiation. Neutrons enter and exit the gas cell through two fused silica windows. A 25-mm diameter thin walled magnesium tube mounted vertically in the center of the gas cell defined the neutron interaction region viewed by the detector. Both silica and magnesium are essentially transparent to neutrons, and the neutron beam is neither significantly scattered nor absorbed upon passing through these materials. Under normal operation the cell is baked for a minimum of 10 h at 70° C. while being evacuated. This removes water and other contaminants from the walls and results in a base pressure of about $3\times10^{-8}$ kPa. After baking and evacuating the cell to the base pressure, ultrahigh purity $^3$He was introduced into it with a gas handling system. This consists of a stainless steel manifold connected to the gas cell through a Microtorr, Model MC1-902-F gas filter to remove trace contaminants from the gas. Subsequent introduction of ultrahigh purity Ar, Kr, and Xe was also through Microtorr filters connected between the manifold and gas cell. Gas pressure in the evacuated cell was measured with a Pfeiffer Vacuum PKR251 gauge. An Omega DPI 705 digital pressure gauge measured the pressures of the admitted gases in the gas cell.

A 4 mm diameter neutron beam from the NG6-A beam line at NCNR was directed into the gas cell. The neutron beam fluence rate was $2.61\pm0.37\times10^{5}\ s^{-1}\ cm^{-2}$, as measured with a calibrated fission detector. FIN radiation is detected with a solar-blind PMT (Hamamatsu R6835), operated at a bias of −2200 V, and located behind a $MgF_2$ window in the gas cell. The response of the detector system is limited by the absorption edge of the $MgF_2$ and the work function of the PMT photocathode, which correspond to wavelengths of 115 and 190 nm respectively. The solid angle subtended by the PMT about the center of the reaction region defined by the magnesium cylinder is 0.0373±0.0008 sr. No radiation produced outside of the cylinder can reach the PMT.

For each reacted neutron, a significant increase in the detected signal was observed when Ar, Kr, and Xe were mixed with the $^3He$. In this experimental system, the $^3He$(n, tp) reaction in the presence of these gases yielded a signal of up to 1000 times greater than that which occurs in the presence of $^4He$ or Ne. The energetic particles traversing the noble gas formed excimers. These excited diatomic molecules radiatively decay with photon emissions in the FUV. FIG. 3 shows the emission spectra of $Ar_2^*$, $Kr_2^*$, and $Xe_2^*$. The emissions from $He_2^*$ and $Ne_2^*$ are below the absorption edge of the $MgF_2$ window of the PMT.

Figure 4:
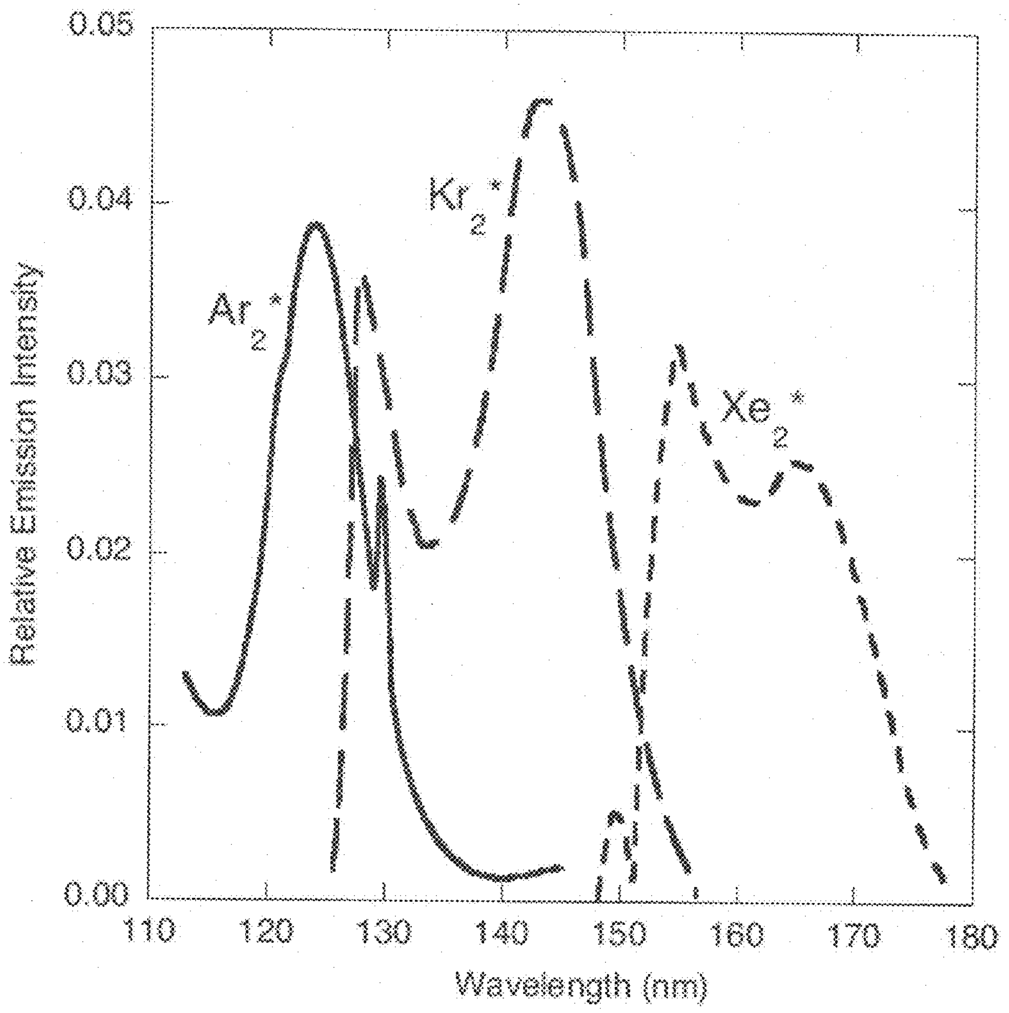
FIG. 4 illustrates emission spectra of excimers produced by passage of charged particles through rare gases in an exemplary embodiment of the present invention.
Figure 5:
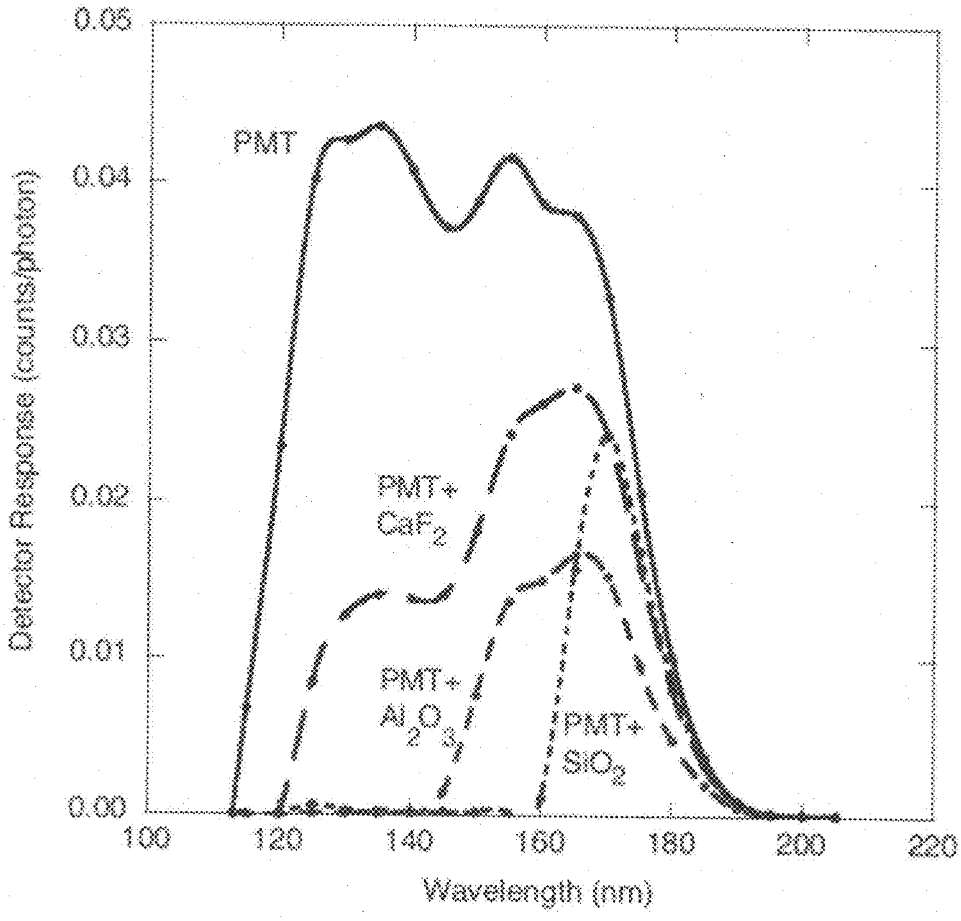
FIG. 5 illustrates detector response as a function of wavelength in an exemplary embodiment of the present invention.

In order to test the hypothesis that the increased signal is due to excimer formation and excimer radiative decay, $CaF_2$, $Al_2O_3$ and $SiO_2$ filters were used. These filters are capable of discriminating among the emissions from the $Ar_2^*$, $Kr_2^*$, and $Xe_2^*$. The transmission of each filter as a function of wavelength was measured from 113 to 226 nm at the NIST Far-Ultraviolet Calibration Facility. These measurements revealed that the filters had poor spatial uniformity, but that the absorption edges were at the expected wavelengths. FIG. 4 shows the response of the PMT in combination with the various filters. The signal enhancements shown in FIG. 5 are due to excimer emission. When each filter is inserted between the $MgF_2$ window at the top of the cell and the PMT, the short wavelength cutoff of the detector system shifted from 115 nm to a longer wavelength: 122 nm for $CaF_2$, 142 nm for $Al_2O_3$, and 160 nm for $SiO_2$. The $Ar_2^*$ excimer emission can be detected only with the $CaF_2$ filter in place; the other two filters are opaque to the emitted radiation. Emission from $Kr_2^*$ can be detected through $CaF_2$ and weakly through $Al_2O_3$, while emission from $Xe_2^*$ can be detected through all three filters.

Figure 6:
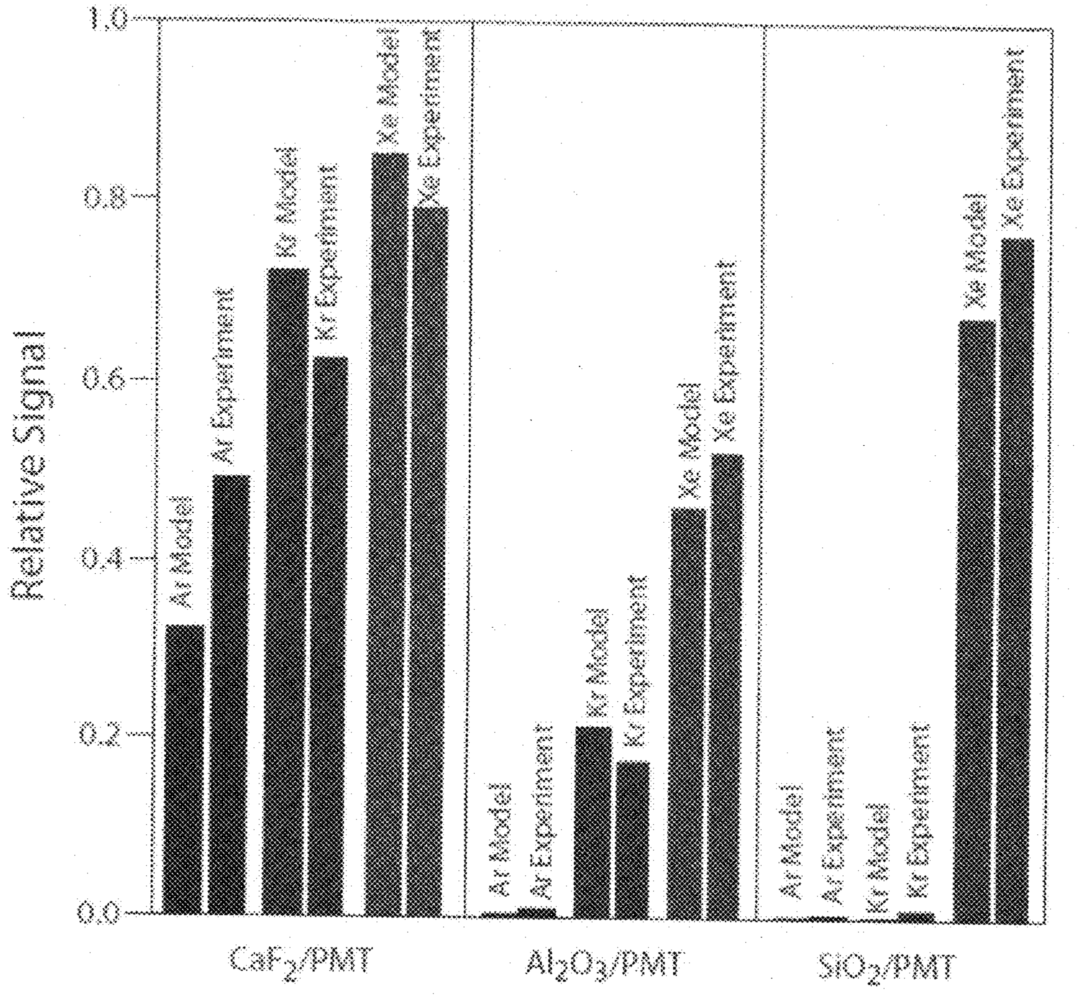
FIG. 6 illustrates a comparison of signal obtained using a slow neutron detection apparatus in accordance with an embodiment of the present invention with expected signals obtained from modeling results.

When the reaction cell was filled with Ar, an enhanced signal was seen only with the $CaF_2$ filter. A Kr-filled cell yielded enhanced signal with $CaF_2$ and $Al_2O_3$. Significant signal gains were observed with all three filters when the cell was filled with Xe. Expected signal enhancements were modeled using the measured filter transmissions and the excimer emission spectra from FIG. 4. FIG. 6 shows that the observed signal enhancement was consistent with the modeling results, indicating that the observed emissions are from noble gas excimers formed by collisions of the energetic proton and triton with noble gas atoms. It is likely that this mechanism is present when the $^3He$ is mixed with $^4He$ or Ne, but the excimer emission of these species is outside the spectral range of the detector used.

Quantitative measurements of the photon yield were made with none of the spectral filters in place. Experimental count rates were corrected for dark current, background gamma radiation, and radiation from the direct interaction of the neutrons and the noble gases. Contributions to the signal from sources other than neutron absorption by $^3He$ were removed by first taking measurements in the evacuated gas cell and then taking measurements with the cell filled with different pressures of the pure noble gases, but without $^3He$. The measurement data obtained from the PMT were also corrected for FUV radiation that is reflected into the photomultiplier by scattering from the wall of the magnesium cylinder. Ray tracing calculations were performed based on a 4 mm diameter cylindrical neutron source and tabulated optical constants for MgO (the surface is assumed to be oxidized rather than unreacted Mg). Depending on the particular model of optical scattering used, the calculations indicated that the ratio of scattered to direct radiation received by the PMT is between 0.14 and 0.31. The results are independent within 10% of whether a point source, line source, or finite cylinder of various diameters is assumed for the origin of the FUV radiation.

Figure 7:
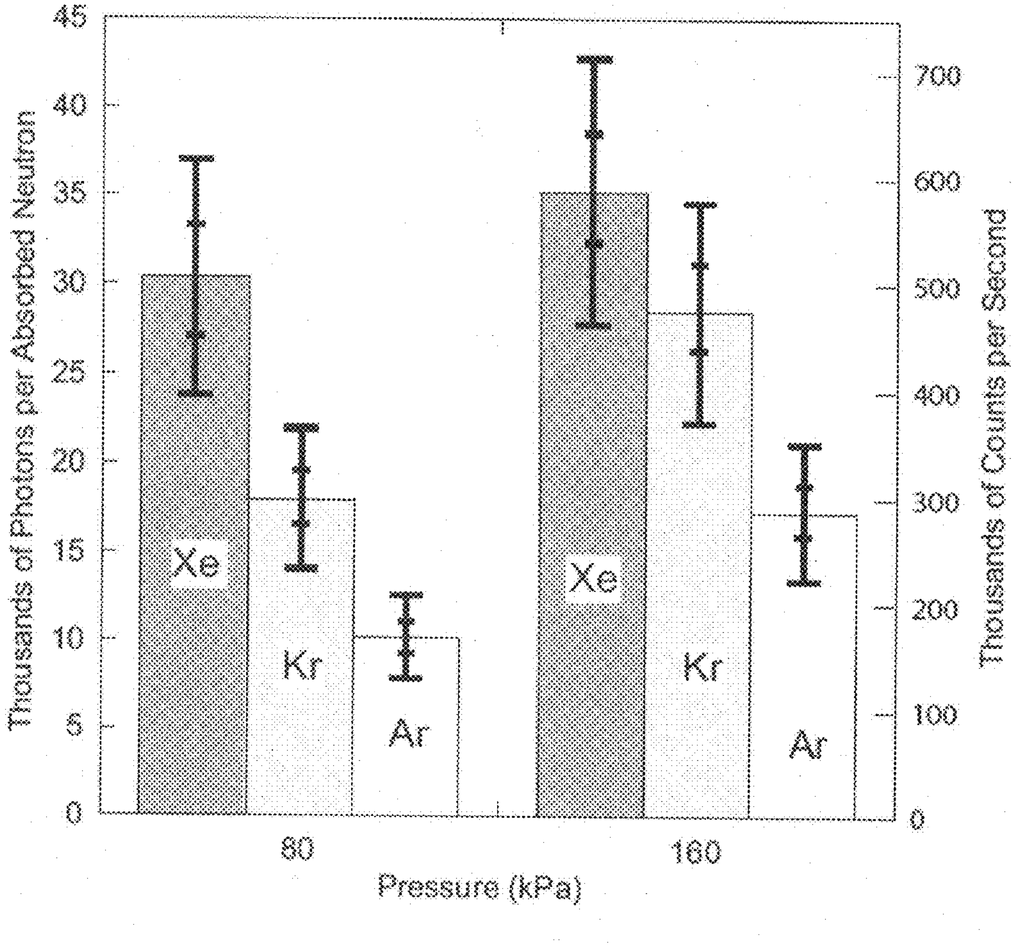
FIG. 7 illustrates the number of photons produced for each neutron reacted in an exemplary embodiment of the present invention.

The number of photons was calculated from the corrected count rate and the response of the PMT. The PMT was calibrated as a function of wavelength from 125 to 210 nm at the normal-incidence radiometry beamline at the NIST SURF III facility. The calibration results were convolved with the emission spectrum of each excimer to determine an effective efficiency of the PMT for each of the noble gases investigated. From the detected photon flux. corrected for background, window transmission, and solid angle, the total number of photons generated was calculated. Using the known cross section of the $^3He$(n,tp) reaction and the neutron flux, the number of neutrons reacted was calculated. The noble gases were added to a base pressure of 26 kPa of $^3He$. The photons per neutron absorbed were calculated assuming the emission spectra shown in FIG. 4. FIG. 7 shows the number of photons produced for each reacted neutron. The uncertainties arise from the counting statistics, PMT calibration, and the corrections applied to the PMT signal and photon flux calculation. The scattered light correction dominates the uncertainty.

At the higher noble gas pressures, the total number of photons emitted per reacted neutron was calculated from the data to be about 17,000 (Ar), 28,000 (Kr), and 35,000 (Xe). The total radiant energy produced was calculated from the mean photon energy and the photon production data. The total kinetic energies of the proton and triton are known to be 764 keV. From the data it was found that the kinetic energies of the $^3He$(n, tp) reaction products are converted into FUV radiant energy with efficiency of 20% (Ar), 29% (Kr), or 33% (Xe). Such high conversion efficiencies are comparable to those reported in noble gases excited by electrical discharges and particle beams. Here it is demonstrated that FUV excimer emissions resulting from the $^3He$(n,tp) reaction can be used as an efficient neutron detector.

Example 2

Far-ultraviolet signatures of $^{10}B$ and $^6Li_2CO_3$ films in noble gas mixtures.

Figure 8:
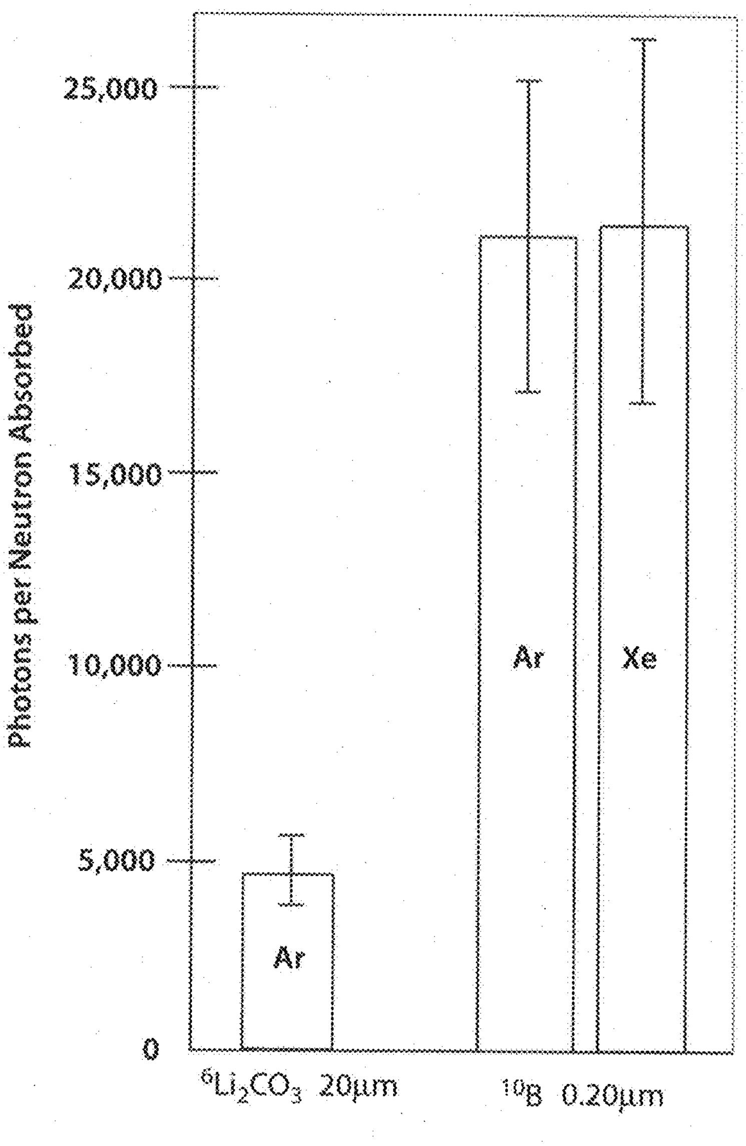
FIG. 8 illustrates the number of photons produced for each neutron reacted for a 20 μm film of $^{6}Li_2Co_3$ in 80 kPa of Ar and a 0.20 μm film of $^{10}B$ in 80 kPa of Ar and Xe.

Thin films of $^{10}B$ and $^6Li_2CO_3$ on silicon substrates have been exposed to slow neutrons in the presence of Ar, and Xe. Though less efficient in terms of photons produced per reacted neutron, the films nevertheless produce thousands of photons per neutron reacted. FIG. 8 shows sample results from these experiments for a 20 μm film of $^6Li_2CO_3$ in 80 kPa of Ar and a 0.20 μm film of $^{10}B$ in 80 kPa of Ar and Xe. There was also an observation of signals obtained with the cell was filled with a partial pressure of 28 kPa of $^{10}BF_3$ and 52 kPa of Xe. Comparing the $^6Li_2CO_3$ and $^{10}B$ film measurements with those for $^3He$ in 80 kPa of Ar (FIG. 7), the $^6Li_2CO_3$ yielded 4,700±900 photons per neutron reacted in Ar compared to 10,000±2000 photons per neutron reacted for $^{3}He$ in Ar at the same pressure. The $^{10}B$ film yielded 21,100±4,100 and 21,500±4,700 photons per neutron reacted in Ar and Xe compared to 10,000±2,000 and 30,000±7,500 for $^{3}He$ in Ar and Xe at the same pressures.

It is thought that the slow neutron detector apparatus and method of the present invention and many of its attendant advantages will be understood from the foregoing description and it will be apparent that various changes may be made in the form, construction arrangement of parts thereof without departing from the spirit and scope of the invention or sacrificing all of its material advantages, the form hereinbefore described being merely a preferred or exemplary embodiment thereof.

We claim:

1. A method for detecting slow neutrons, said method comprising:

reacting a plurality of slow neutrons with a high neutron capture cross section nucleus, wherein the plurality of slow neutrons is a beam having a diameter of about 4 mm and a fluence rate of about $(2.61\pm0.37)\times10^{5}$ neutrons/$cm^{2}$ s and the subsequent compound nucleus decays into a plurality of particles;

exposing the plurality of particles to at least one inert gas, wherein the plurality of particles interact with the at least one inert gas to form at least one excimer; and monitoring the at least one excimer for an optical signal comprising a plurality of photons in the far-ultraviolet region of the electromagnetic spectrum, wherein the optical signal in the far ultraviolet region of the electromagnetic spectrum indicates radiative decay of the at least one excimer, wherein the radiative decay of the at least one excimer comprises emission of the plurality of photons in the far ultraviolet region of the electromagnetic spectrum.

2. The method of claim 1, further comprising: detecting the plurality of photons in the far ultraviolet region emitted by the radiative decay of the at least one excimer;

and determining the number of photons emitted for each of the plurality of the reacted slow neutron.

3. The method of claim 1, wherein the compound nucleus is a high-capture cross-section nucleus.

4. The method of claim 3, wherein said high-capture cross-section nucleus is selected from a group comprising $^{10}b$, $^{6}Li$, and $^{3}He$.

5. The method of claim 1 wherein the at least one inert gas is selected from a group comprising Ar, Kr, and Xe.

6. The method of claim 4 wherein said $^{10}B$ is in gaseous phase.

7. The method of claim 4 wherein said $^{10}B$ is in solid phase.

8. The method of claim 1, wherein the high neutron capture cross section nucleus $^{10}B$ in the compound $^{10}BF_3$.

9. An apparatus for detecting a plurality of slow neutrons, said apparatus comprising:

at least one cell among a plurality of cells, wherein the at least one cell comprising an interaction region for reacting the plurality of slow neutrons with a high neutron capture cross section nucleus and at least one inert gas;

a cylinder defining the interaction region, wherein the cylinder is positioned vertically in the center of the at least one cell;

an entry port on the at least one cell of the plurality of cells for receiving the plurality of slow neutrons, wherein the plurality of slow neutrons is a beam having a diameter of about 4 mm and a fluence rate of about $(2.61\pm0.37)\times10^{5}$ neutrons/$cm^{2}$ s;

an exit window on the at least one cell of the plurality of cells for allowing the plurality of slow neutrons to exit the at least one cell of the plurality of cells;

at least one detector positioned within a field of view of the interacting region for detecting an optical signal in the far ultraviolet region of the electromagnetic spectrum from the at least one cell, wherein the detector generates a signal upon detection of the optical signal in the far ultraviolet region of the electromagnetic spectrum; and a processor associated with the at least one cell, and the at least one detector for processing the signal generated by the detector to measure slow neutron fluence.

10. The apparatus of claim 9, further comprising a chamber enclosing a differentially pumped volume for isolating and evacuating the unreacted plurality of slow neutrons exiting interaction region.

11. The apparatus of claim 9, further comprising a gas handling system for maintaining a base pressure inside the at least one cell.

12. The apparatus of claim 9, wherein the exit port is comprised of a material selected from a group consisting of $MgF_2$, $CaF_2$, $Al_2O_3$, $SiO_2$.

13. The apparatus of claim 9, wherein the cylinder is comprised of a material selected from a group consisting of magnesium, aluminum, silicon.

14. The apparatus of claim 9, wherein the cylinder has a thickness of about 0.5 mm and a diameter of about 25 mm.

15. A method for detecting slow neutrons, said method comprising:

reacting a plurality of slow neutrons with a high neutron capture cross section nucleus, wherein the plurality of slow neutrons is a beam having a diameter of about 4 mm and a fluence rate of about $(2.61\pm0.37)\times10^{5}$ neutrons/$cm^{2}$ s and the subsequent compound nucleus decays into a plurality of particles;

exposing the plurality of particles to at least one inert gas, wherein the plurality of particles interact with the at least one inert gas to form at least one excimer;

detecting an optical signal comprising a plurality of photons in the far-ultraviolet region of the electromagnetic spectrum, wherein the optical signal in the far ultraviolet region of the electromagnetic spectrum indicates radiative decay of the at least one excimer, wherein the radiative decay of the at least one excimer comprises emission of the plurality of photons in the far ultraviolet region of the electromagnetic spectrum; and processing the optical signal comprising the plurality of photons in the far-ultraviolet region of the electromagnetic spectrum to measure slow neutron fluence.

16. The method of claim 15, wherein the compound nucleus is a high-capture cross-section nucleus.

17. The method of claim 16, wherein said high-capture cross-section nucleus is selected from a group comprising $^{10}B$, $^{6}Li$, and $^{3}He$.

18. The method of claim 15 wherein the at least one inert gas is selected from a group comprising Ar, Kr, and Xe.

19. The method of claim 15, further comprising determining the number of photons emitted for each of the plurality of the reacted slow neutron.

* * * * *